(12) United States Patent
Polivka

(10) Patent No.: US 8,934,832 B2
(45) Date of Patent: Jan. 13, 2015

(54) SYSTEM AND METHOD FOR COLLABORATIVE DEVELOPMENT OF ONLINE COURSES AND PROGRAMS OF STUDY

(75) Inventor: George Bryan Polivka, Owings Mills, MD (US)

(73) Assignee: Laureate Education, Inc., Baltimore, MD (US)

( * ) Notice: Subject to any disclaimer, the term of this patent is extended or adjusted under 35 U.S.C. 154(b) by 185 days.

(21) Appl. No.: 12/486,479

(22) Filed: Jun. 17, 2009

(65) Prior Publication Data

US 2009/0311658 A1    Dec. 17, 2009

Related U.S. Application Data

(60) Provisional application No. 61/073,157, filed on Jun. 17, 2009.

(51) Int. Cl.
    *G09B 5/00*    (2006.01)
(52) U.S. Cl.
    CPC ........................................ *G09B 5/00* (2013.01)
    USPC ............................ 434/350; 434/322; 434/323
(58) Field of Classification Search
    CPC ............................................................. G09B 7/00
    USPC .................................. 434/322, 323, 350, 362
    See application file for complete search history.

(56) References Cited

U.S. PATENT DOCUMENTS

| | | | |
|---|---|---|---|
| 5,566,291 A * | 10/1996 | Boulton et al. ............... | 715/709 |
| 5,590,360 A | 12/1996 | Edwards | |
| 6,471,521 B1 | 10/2002 | Dornbush et al. | |
| 6,773,266 B1 * | 8/2004 | Dornbush et al. ............. | 434/322 |
| 2002/0042780 A1 * | 4/2002 | Yang ............................... | 705/56 |
| 2002/0073177 A1 * | 6/2002 | Clark et al. .................... | 709/219 |
| 2002/0138520 A1 * | 9/2002 | Wakai et al. .................. | 707/517 |
| 2003/0009742 A1 | 1/2003 | Bass et al. | |
| 2003/0040949 A1 | 2/2003 | Baccaro et al. | |
| 2003/0074370 A1 | 4/2003 | Gargano et al. | |
| 2003/0078934 A1 * | 4/2003 | Cappellucci et al. ......... | 707/101 |

(Continued)

OTHER PUBLICATIONS

International Search Report and Written Opinion dated Aug. 19, 2009, directed to counterpart PCT/US2009/047665 application. (9 pges).

*Primary Examiner* — Bruk Gebremichael
(74) *Attorney, Agent, or Firm* — Venable LLP; Jeffri A. Kaminski; Annette K. Kwok

(57) ABSTRACT

A system and method for developing a course requires a plurality of participants that collaborate over a network, for example, a social network. A database stores an initial framework that defines a sequence of learning units for creating a desired learning environment for students, those learning units made of specifically ordered content objects. The learning units are identified by corresponding learning unit identifiers. A plurality of workstations coupled to the network are used for entry of reviewer information by the participants using the learning environment created for the students. The reviewer information comprise one or more comments entered by one participant about a learning unit or content object and a rank entered by anther participant about the comment, with the rank being correlated with a defined ranking standard. A processor processes the rank according to a predefined criteria to produce a ranking result that is associated with a learning unit identifier. The ranking result is used for associating learning content to the learning unit identified by the learning unit identifier.

20 Claims, 12 Drawing Sheets

(56) References Cited

U.S. PATENT DOCUMENTS

| | | |
|---|---|---|
| 2004/0143603 A1* | 7/2004 | Kaufmann et al. ........ 707/104.1 |
| 2004/0157193 A1 | 8/2004 | Mejias et al. |
| 2004/0162751 A1* | 8/2004 | Tsyganskiy et al. ............ 705/10 |
| 2005/0123892 A1 | 6/2005 | Cornelius et al. |
| 2006/0168233 A1* | 7/2006 | Alcorn et al. ................ 709/226 |
| 2007/0016650 A1 | 1/2007 | Gilbert et al. |
| 2007/0100829 A1* | 5/2007 | Allen et al. ...................... 707/9 |
| 2007/0219795 A1* | 9/2007 | Park et al. ...................... 704/246 |
| 2007/0224586 A1* | 9/2007 | Massie et al. ................ 434/350 |
| 2007/0250378 A1 | 10/2007 | Hughes et al. |
| 2008/0059286 A1* | 3/2008 | Nickerson et al. ............. 705/10 |
| 2009/0035733 A1* | 2/2009 | Meitar et al. .................. 434/118 |
| 2009/0094039 A1* | 4/2009 | MacDonald et al. ............. 705/1 |

\* cited by examiner

| RAPID DEVELOPMENT PROCESS | | | | |
|---|---|---|---|---|
| Course Level Step | Inputs | Outputs | Resources | Process |
| COURSE SKETCH | Final Curriculum Course Names Course Outcomes Key CS Names | Course Sketch Project Setup Collaboration Scheduled | Faculty & Designer (Core Team) | 2 people (Core Team) collaborate online |
| COLLABORATION – DEVELOPMENT | Course Sketch Email list of Participants | Final Scope and Sequence (FSS) Proposed Assets Participant Rankings | Core Team, Faculty, CS's consultants, Publishers, Contractors, practitioners, students | Core Team works with Web 2.0 tools to receive input from a variety of sources (Collaboration Group) |
| DIGITAL CONTENT PLANNING | Final Scope and Sequence (FSS) | Digital Content Planner | Faculty Designer Writer Producer | Core Team finalizes content plan |
| DIGITAL CONTENT DEVELOPMENT AND ACQUISITION | Digital Content Planner | Digital Content | Core Team, Content Providers, Media Production | Core Team and producers create and outsource assets |
| DESIGN AND INGEST | Digital Content | Course | Core Team, Writer | Editing and ingesting into DRAMS tool |
| COLLABORATIVE Q&A | Course | Bug List | Collaboration Group | Testing Course online |
| EDIT AND BUG FIX | Bug List, Digital Content | Final Course | Core Team Media Production | Core Team & Media re-edit |

FIG. 12

SYSTEM AND METHOD FOR COLLABORATIVE DEVELOPMENT OF ONLINE COURSES AND PROGRAMS OF STUDY

CROSS-REFERENCE TO RELATED APPLICATION

This application is related to and claims priority to U.S. Provisional patent application No. 61/073,157, filed Jun. 17, 2008, the specification of which is hereby incorporated by reference in its entirety.

BACKGROUND OF THE INVENTION

1. Field of Invention

The present invention relates to the development of educational course plans and course material in general, and to a system and method of developing such course plans and materials through an online collaboration environment.

2. Description of Related Art

Typically, course development processes for online higher education are either expensive and time consuming, or inexpensive, quick, and low quality. To produce quality rich media and world class content, these processes absorb multiple high-end internal and external resources in the form of course developers, content experts, instructional designers, and media producers. Even with heavy media production, the majority of the cost of the development goes to design, in the form of course summits and highly compensated teams of developers, consultants and faculty.

Alternatively, many online courses are developed by a single faculty member with few resources. Even with rich media, the development team typically consists of no more than two individuals: a "course developer," usually a faculty member, and a "designer," often an instructional designer or rich media producer. The course developer generates a course overview or course outline based upon specified learning objectives, and writes the course in a text-based format. The designer may then add data objects, such as web-pages, documents, and audio/video clips, to create the course. The course is then accessed through the web by the student at his or her remote learning station.

U.S. Patent Publication No. 2004/0157193, issued Aug. 12, 2004 to Mejias et al., describes a course development system whereby an electronic course overview is generated, placeholder web pages are added to mirror the course structure, course content is produced for each learning object and the learning objects are then embedded into the placeholder web pages.

U.S. Patent Publication No. 2003/0040949, issued Feb. 27, 2003 to Baccaro et al, describes a method for course development wherein course developers, a content manager and content developer, design and develop a training course, evaluate the training course created and revise the training course to satisfy the principles of effective learning.

U.S. Patent Publication No. 2003/0074370, issued Apr. 17, 2003 to Gargano et al., describes a system for object-based delivery of online courses generated through the use of new content, existing content or the combination of newly entered and existing content.

U.S. Patent Publication No. 2003/0009742, issued Jan. 9, 2003 to Bass et al., describes a tool that enables those charged with instruction and training to develop a web-based training course without any formal training, either individually or jointly in synchronous or asynchronous modes. The tool utilizes a virtual environment, chat rooms and an information and objects area for course development collaboration.

U.S. Pat. No. 5,590,360, issued Dec. 31, 1996 to Edwards, describes a software program operating on a local area network that allows multiple users to enter information in response to an ordered sequence of screens, to store entered information into a database and to format the information stored into a computer-based model of processes and data.

U.S. Patent Publication No. 2007/0016650, issued Jan. 18, 2007 to Gilbert et al., describes a method for collaborative authorship and delivery of instructional materials to a content database for an educational course. Authors may add, modify, upload or download content and may receive server updates on the activities of other authors in real time.

U.S. Patent Publication No. 2005/0123892, issued Jun. 9, 2005 to Cornelius et al., describes a system for developing interactive simulation-based training products that gives a developer the ability to create a training product from scratch or through the use of libraries, edit the program and associated interactive objects, as well as develop an evaluation system to create or modify evaluation criteria for the progress of the trainee, a support materials system and a reviewer used to execute a portion or all of a training course.

With the increasing use of online educational courses throughout the world, there is a commensurate need to develop courses efficiently and in a cost-effective manner, as well as to produce courses that provide accurate, high-quality, complete and up-to-date course content to students.

SUMMARY OF THE INVENTION

Briefly according to the present invention, a system and method for developing a course requires a plurality of participants that collaborate over a network, for example, a social network. A database stores an initial framework that defines a sequence of learning units for creating a desired learning environment for students. The learning units are identified by corresponding learning unit identifiers. A plurality of workstations coupled to the network are used for entry of reviewer information by the participants using the learning environment created for the students. The reviewer information comprise one or more ranks or comments entered by one participant about a learning unit or a learning object and a rank entered by another participant about the comment, with the rank being correlated with a defined ranking standard. A processor processes the rank according to a predefined criteria to produce a ranking result that is associated with a learning unit identifier. The ranking result is used for associating learning content to the learning unit identified by the learning unit identifier.

According to some of the more detailed features of the invention, the learning units is identified by a place-holder pointer that is used for insertion of learning content after the sequence of the learning units is defined. One or more participants can be a plurality of reviewers that enter the reviewer information anonymously and at least one core team member involved in defining the initial frame work who has access to the anonymously entered reviewer information. Other participant can be one or more faculties, students, parents, teachers, content publishers or course developers.

According to other more detailed features of the invention, a participant tracking module tracks participants entries for compensating a participant based on a defined compensation criteria. Such compensation criteria may be based on the ranking result. A content acquisition module can be used to generates learning content orders to content vendors. A digital rights management (DRM) system or a digital asset management (DAM) system can interface with the database as well as an institutional gradebook. A workflow module can be used to set the schedule for guiding the participants thorough the course development process.

BRIEF DESCRIPTION OF THE DRAWINGS

FIG. 12 shows an exemplary diagram of the resources associated with the collaborative online course development method.

DETAILED DESCRIPTION

Overall System Description

The present invention relates to a course development system and method utilizing an online collaboration and ranking tool designed to greatly reduce the time and effort necessary for the development of a course online while vastly improving the amount of input from experts, designers, and students. Essentially, a collaborative course development environment according to the present invention involves a number of participants, including one or more core team participants, one or more course reviewers and one or more administrators. While one embodiment of the invention utilizes only a few key participants, the participants in the collaborative course development of the present invention may include any number of course developers, content editors, students, faculty and content providers, as well as other stakeholders/participants and interested parties, that may be involved in one or more course development processes. Such processes may require participants to define an initial framework for a course under development, which has a sequence of learning units associated with the course. Content items associated with the sequence can be inserted and ranked by the reviewers over a network. The reviewer rankings are compared to a pre-defined satisfaction criteria and content items are modified based on the result.

Figure 1:
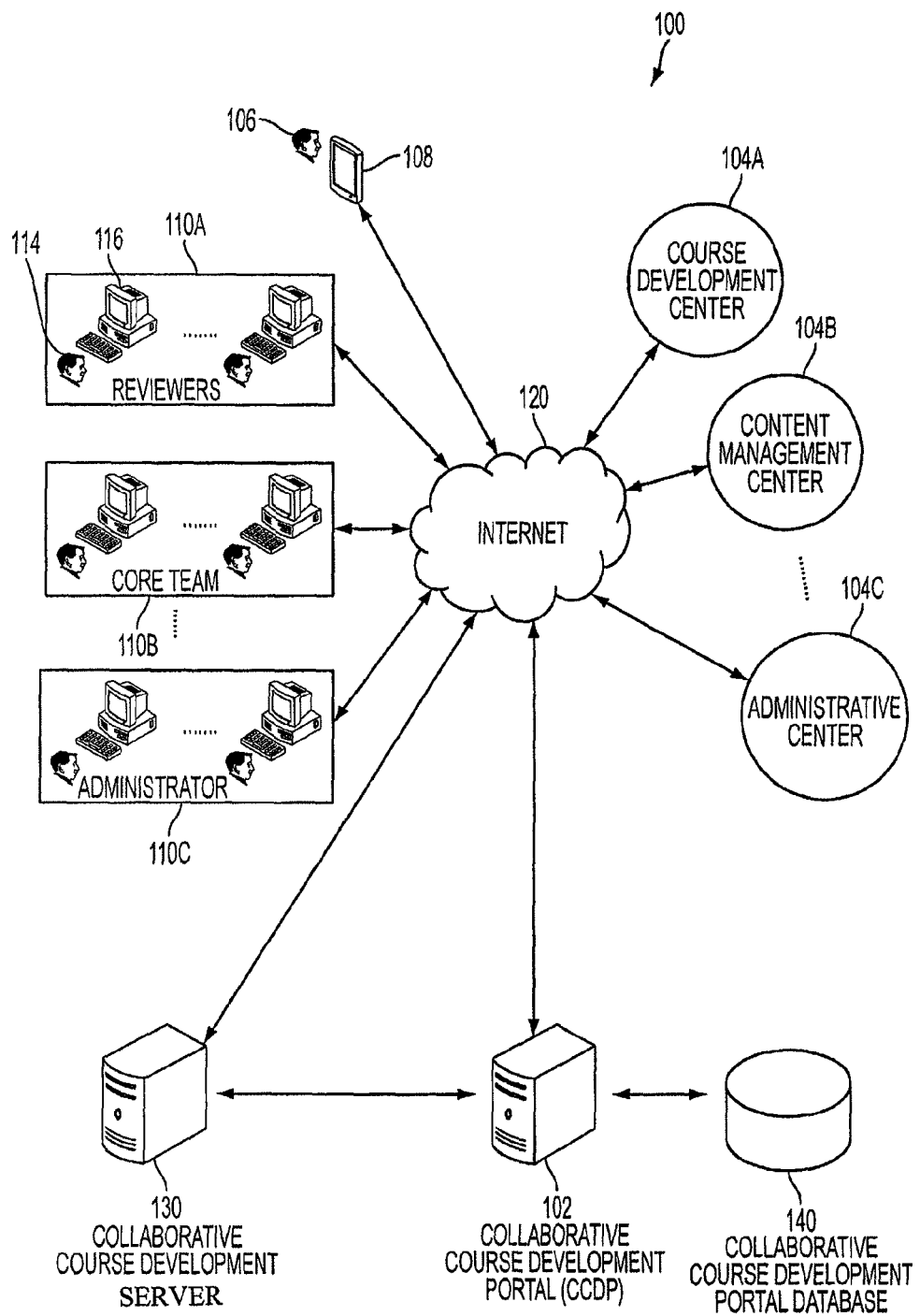
FIG. 1 shows an exemplary block diagram of a collaborative course development system according to one embodiment of the invention.

FIG. 1 depicts an exemplary block diagram of a collaborative course development system 100 according to an exemplary embodiment of the present invention. According to this embodiment, a course development center 104A, a content management center 104B and a administrative center 104C are connected to a collaborative course development portal (CCDP) 102 through a network, such as the internet 120. Also connected to the CCDP 102, which is part of the collaborative course development environment of the present invention, is a plurality of user nodes 116. The user nodes 116 may comprise one or more reviewer workstations 110A, core team member workstations 110B and/or administrator workstations 110c, etc.

Generally, a network comprises a plurality of privately or publicly connected nodes that are enabled to exchange information over one or more links. Exemplary networks comprise any one or more of WANs, LANs, PANs, internet 120 (as shown in FIG. 1) or Extranets. The internet 120 is a collection of interconnected (public and/or private) networks that are linked together by a set of standard protocols to form a global, distributed network. A node comprises one or more units (software or hardware or both) and/or devices located anywhere in the network that processes information and/or performs an attributed function. Examples of nodes include server nodes, client nodes, computer nodes, processing node, communication nodes, work stations, PDAs, mobile devices, forming any of data entry nodes, scheduling nodes, accounting nodes, matching nodes, instructional delivery nodes, teacher selection nodes, etc. The nodes can be connected to each other according to any suitable network model, including but not limited to client server models as well as a hierarchical or distribution models. A link comprises any medium over which two nodes may communicate information with each other. Exemplary links include, but are not limited to, wired, fiber, cable, or wireless links. A communication channel comprises any channel used with a link for delivery of course, learning or instructional material content, or environments amongst participants in the course development process of the invention.

According to the exemplary embodiment of FIG. 1, a user node can be a wireless node 108 used by an individual user 106 for connecting to the network. The users 106, 114 at the user nodes 108, 116 can be core team members, administrators, faculty, teachers, students, consultants, publishers, suppliers, course developers, etc. Alternatively, the user may be a responsible authority registered at the course development center 104A, content management center 104B, or the administrative center 104C.

In one embodiment, the CCDP 102 provides a gateway between the user nodes 108, 116, the course development support centers 104A-C, and the collaborative course development system (CCDS) 130 through the network 120. The CCDS 130 executes suitable applications for providing one or more collaborative course development environments during which the core team and reviewers can work collaboratively for developing courses. As further described later in details, such collaborative course development may take place over mass collaboration systems or social networking systems. In one exemplary embodiment, the CCDS 130 can be a stand alone system providing collaborative course development sessions to participants according to the present invention.

As is described later in more detail, the CCDS 130 provides the necessary user interfaces for the core team members, reviewers, administrators and other participants' to communicate with one another, for example, allowing the core team members to interact with and monitor reviewer participants activities. The CCDS 130 can also access one or more databases containing information relating to participant, course content and instructional material that is shared by participants during the course development process. The CCDS 130 also includes one or more databases containing reviewer comments and rankings, pre-defined satisfaction criteria and results of ranking comparisons as further described below.

The CCDP 102 provides an interface between the users, e.g. core team, reviewers or any course development participant, and the CCDS 130. The CCDP 102 may also provide an interface for course development administrators to access the CCDS 130. The CCDP 102 is provided with a collaborative course development portal database 140 which stores user information for all participants enrolled or associated with each course development process. The CCDP 102 provides means for participants to log onto the collaborative course development system 130 with a user ID and password. Based on the access privilege associated with the user ID, the CCDP 102 may authenticate the participant as a core team member, an administrator or a reviewer, a teacher, faculty, or student, etc. The CCDP 102 also tracks the core team and reviewers' scheduling, attendance and billing. Finally, the CCDP 102 synchronizes the information stored between the CCDS 130 and the support centers 104A-C.

The core team and reviewers can hold online collaboration sessions remotely from their user devices, including but not limited to other public areas without having to attend in-center development sessions. Through the collaborative course development environment created by the system and method of the present invention, a core team member can assign instructional material to a reviewer enrolled in the course development process, monitor the reviewer's progress, and interface with the reviewer through interactive communication channels in real time or non-real time modes.

Figure 2:
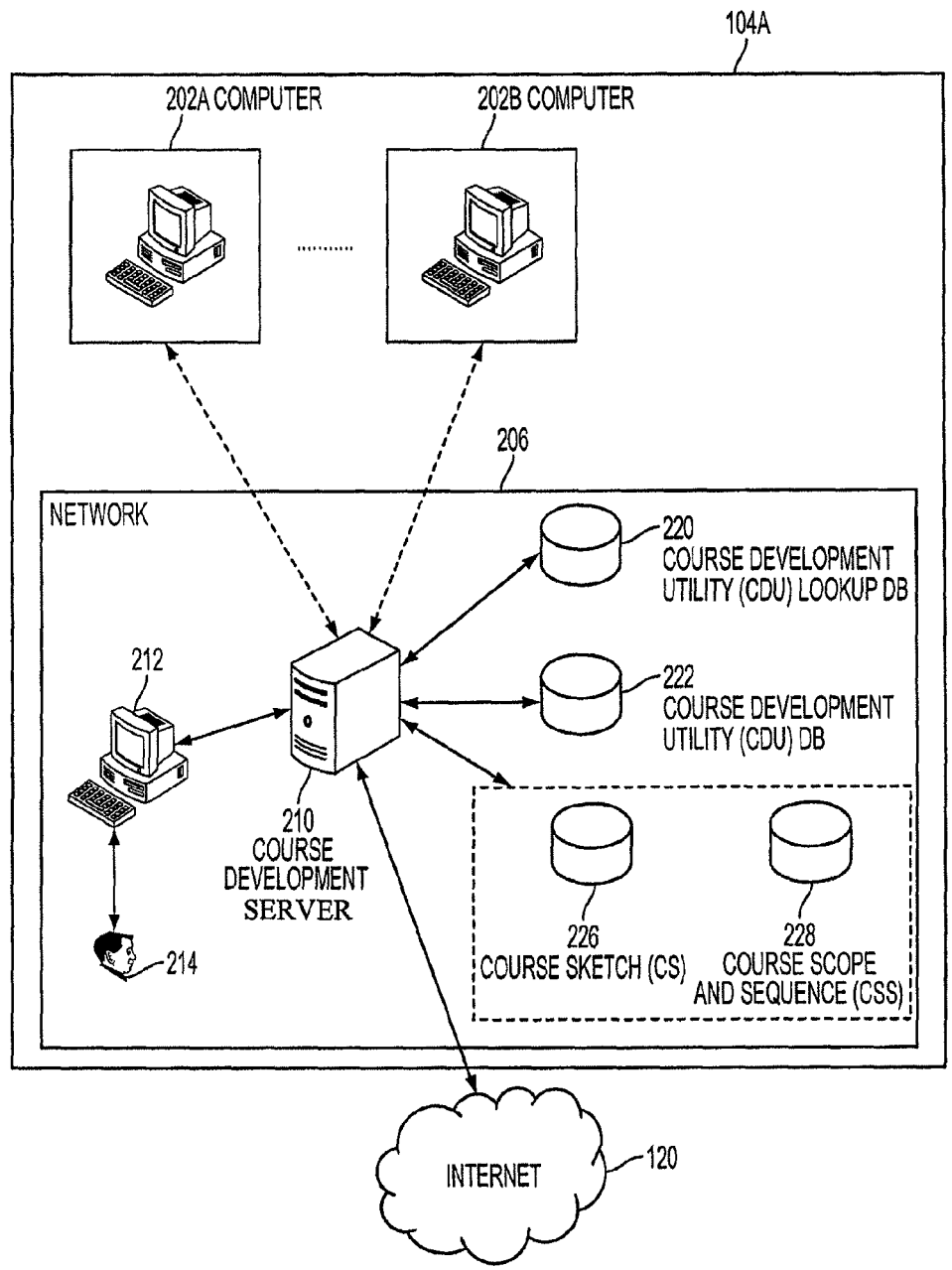
FIG. 2 shows an exemplary block diagram of the course development center in the course development system of FIG. 1.

FIG. 2 depicts an exemplary block diagram of the course development center (CDC) 104A in the course development system 100 of FIG. 1, which is managed and maintained by the core team and one or more administrators. The CDC 104A includes one or more workstations 202A-B and a course development network 206. The course development network 206 includes a CDC server 210 providing connectivity to the internet 120. The course development network 206 also includes a system administrator 214 who monitors and administers the local server 210 through a workstation 212.

The CDC server 210 executes a course development utility (CDU) that provides the platform for creating course frameworks as well as delivering and or receiving instructional material to and from reviewers during the development process. The CDC server 210 is coupled to a CDU database 222 which stores reviewer information, including contact information, work history, academic history, publications, awards, honors and other reviewer credentials. During the collaboration sessions the CDU retrieves the reviewer information from the CDU database 222 and, based on core team instructions, utilizes the appropriate review and instructional material from the CDU database 222 to create an interactive collaboration session for the reviewer. The CDC is further coupled to a CDU lookup database 220, which is used to store reviewer information for cost projection, billing and lookup purposes. In one exemplary embodiment, the CDU tracks the reviewer's activities, progress and quality of ranking and updates the reviewer's profile accordingly. In an alternative embodiment, at the conclusion of a collaboration session, the core team updates each reviewer's profile based on the reviewer's activities, progress and quality of ranking during the collaboration session. The reviewer's profile is also updated in the CDU database 222.

In an exemplary embodiment, the CDC server 210 is coupled to a course sketch database 226 and a course scope and sequence database 228. A course sketch defines an initial frame of a course under development and the course sketch database 226 stores content and material that is associated with defining such initial course frameworks, including development steps to be followed by the core team to create the course sketch. A course scope and sequence reflects the progress made toward creating the course based on the course sketch and the course scope and sequence database 228 stores content and material that is associated with achieving a developed course, including data related to the final course product. The databases 222, 226 and 228 may also store other information, such as the core team's schedule and reviewers' schedule, e.g. hourly, daily, weekly or monthly. Such databases may also store course content lists and reviewer rankings.

Figure 3:
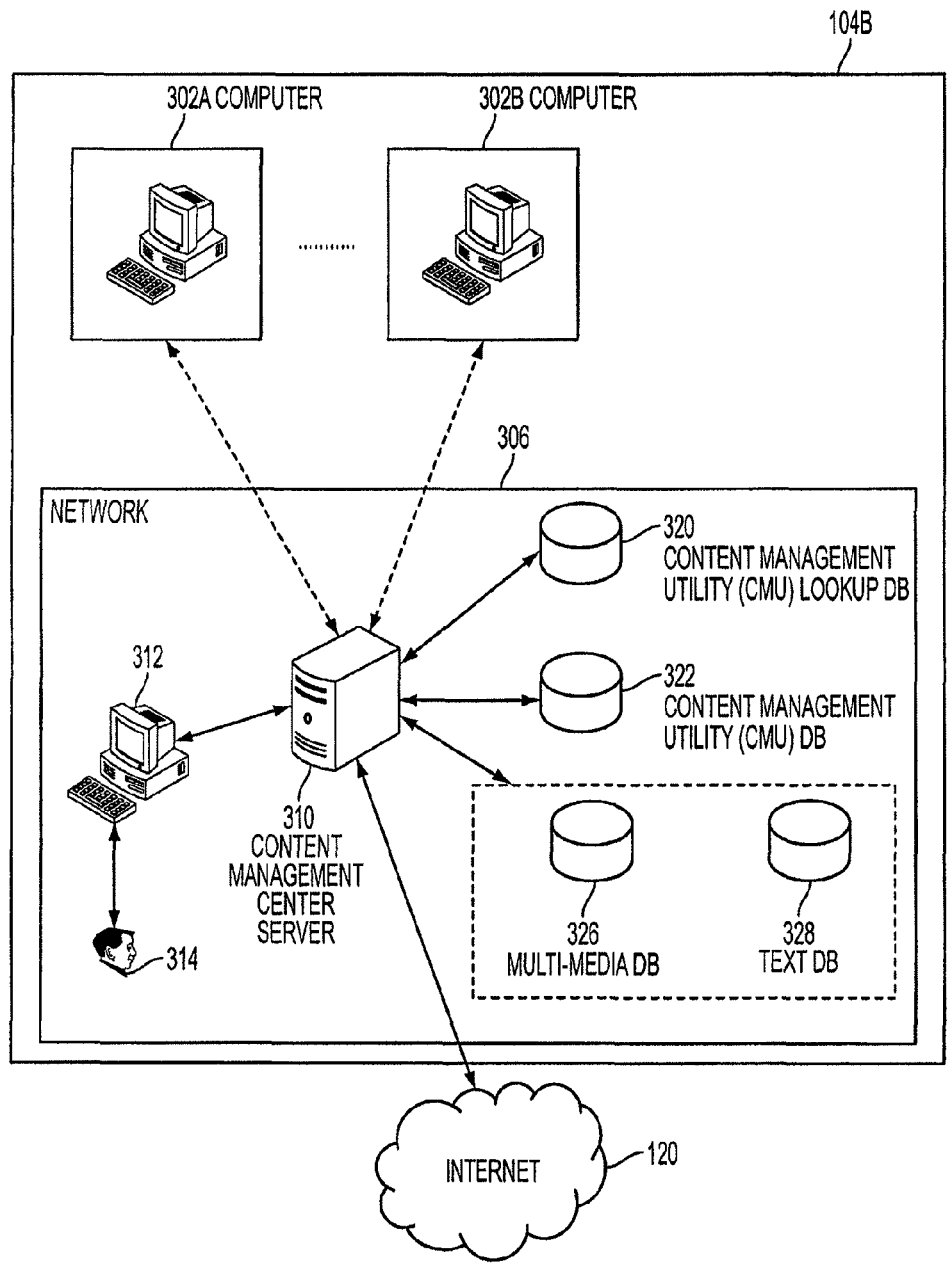
FIG. 3 shows an exemplary block diagram of a content management center in the course development system of FIG. 1.

FIG. 3 depicts an exemplary block diagram of the content management center 104B in the course development system 100 of FIG. 1, which is managed and maintained by one or more administrators and accessible by those participants who are involved in the course development process, namely course developers. The content management center 104B includes one or more workstations 302A-B and a content management network 306 that is used by the core team members and course developers. The content management network 306 includes a content management server 310 providing connectivity to the internet 120. The content management network 306 also includes a system administrator 314 who monitors and administers the local server 310 through a workstation 312.

The content management server 310 executes a content management utility that provides the platform for storing course content, including multi-media and non multi-media content, as well as delivering such content to reviewers during collaboration according to the present invention between the course development participants. The content management server 310 is coupled to a content management utility database 322 which stores course content and content information, including copyrights, fees, delivery dates and cost adjustments.

During the collaboration sessions the content management utility retrieves from and/or stores in the content management utility database 322 content and related information for use in the course development process and based on core team instructions, delivers specific content to reviewers for comments and ranking. Additionally, the content management utility database 322 may store additional course content recommended and uploaded by the course developers and reviewer during the course development process. The content management center is also coupled to a content management utility lookup database 320, which is used to store course content information for cost projection, billing and lookup purposes.

In addition to the content management utility, the content management center server 310 is provided with a database utility providing one or more content databases 326 and 328. The content management utility uses the collaborative course development environment of the invention to process the reviewers' ranking and comments associated with each content item, which can be in any suitable form including video, images, audio, multi-media, text, etc. In an exemplary embodiment, the database 326 or 328 may store a multi-media course content item list.

Figure 4:
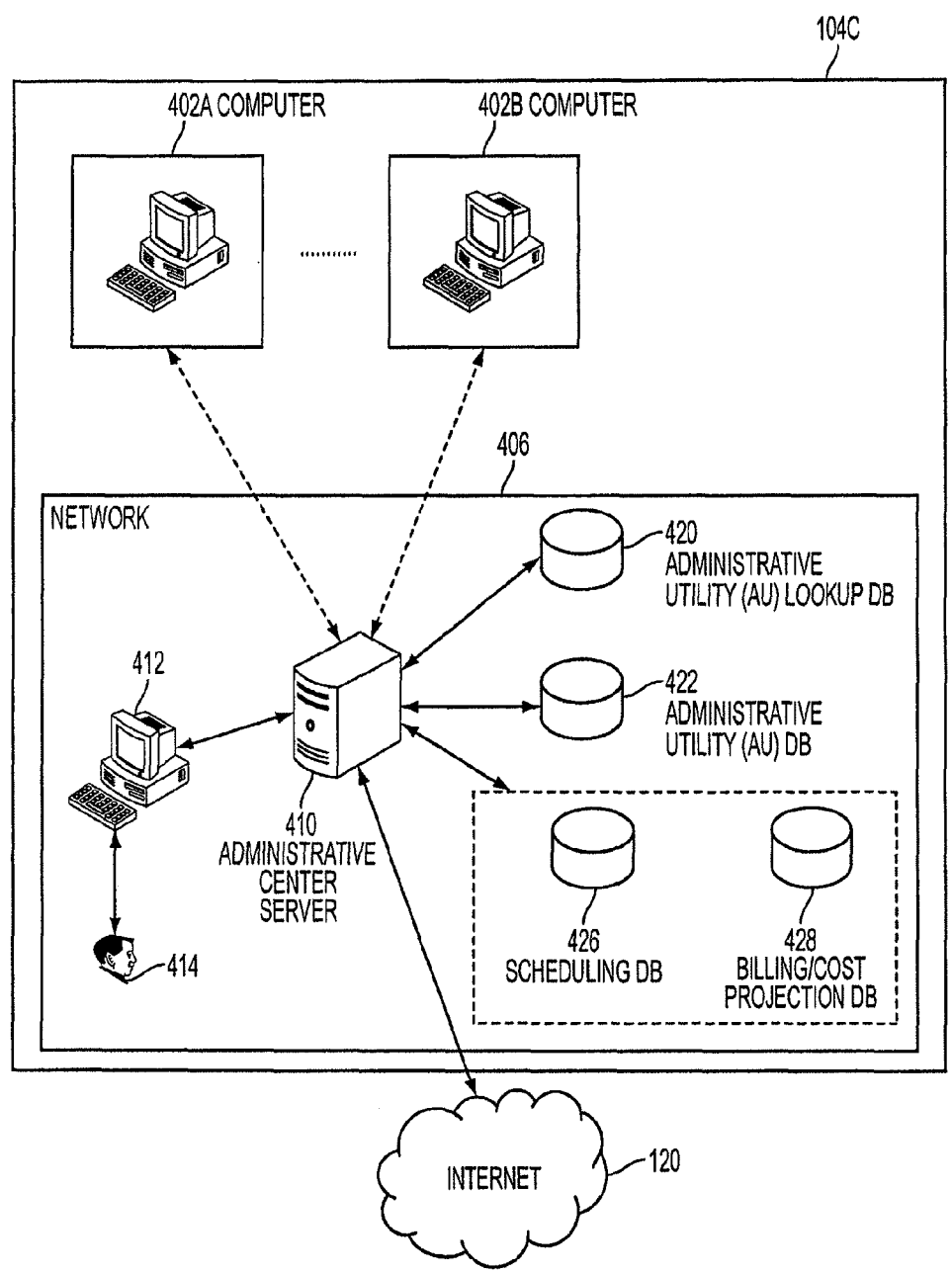
FIG. 4 shows an exemplary block diagram of an administrative center in the course development system of FIG. 1.

FIG. 4 depicts an exemplary block diagram of the administrative center 104C in the course development system 100 depicted in FIG. 1, which is managed or maintained by one or more administrators. The administrative center 104C includes one or more workstations 402A-B and an administrative network 406. The administrative network 406 includes a administrative center server 410 providing connectivity to, for example, the internet 120. The administrative network 406 also includes a system administrator 414 who monitors and administers the local server 410 through a workstation 412.

The administrative center server 410 executes an administrative utility that provides the platform for scheduling core team development and mass collaboration sessions, as well as providing cost projection and billing reports. The administrative center server 410 is coupled to a administrative utility database 422 which stores scheduling and billing content information.

Throughout the course of development the administrative utility retrieves the scheduling and billing information from the administrative utility database 422. The administrative center is also coupled to a administrative utility lookup database 420, which is used to store information for cost projection, billing, scheduling and lookup purposes and information related to the progress of core team members and reviewers, reviewer and core team salaries, as well as information covering time-on-task, overtime and billing adjustments that may be used to create cost projection reports, invoices or bills. The administrative utility uses the mass collaboration sessions to track reviewer progress.

Figure 5:
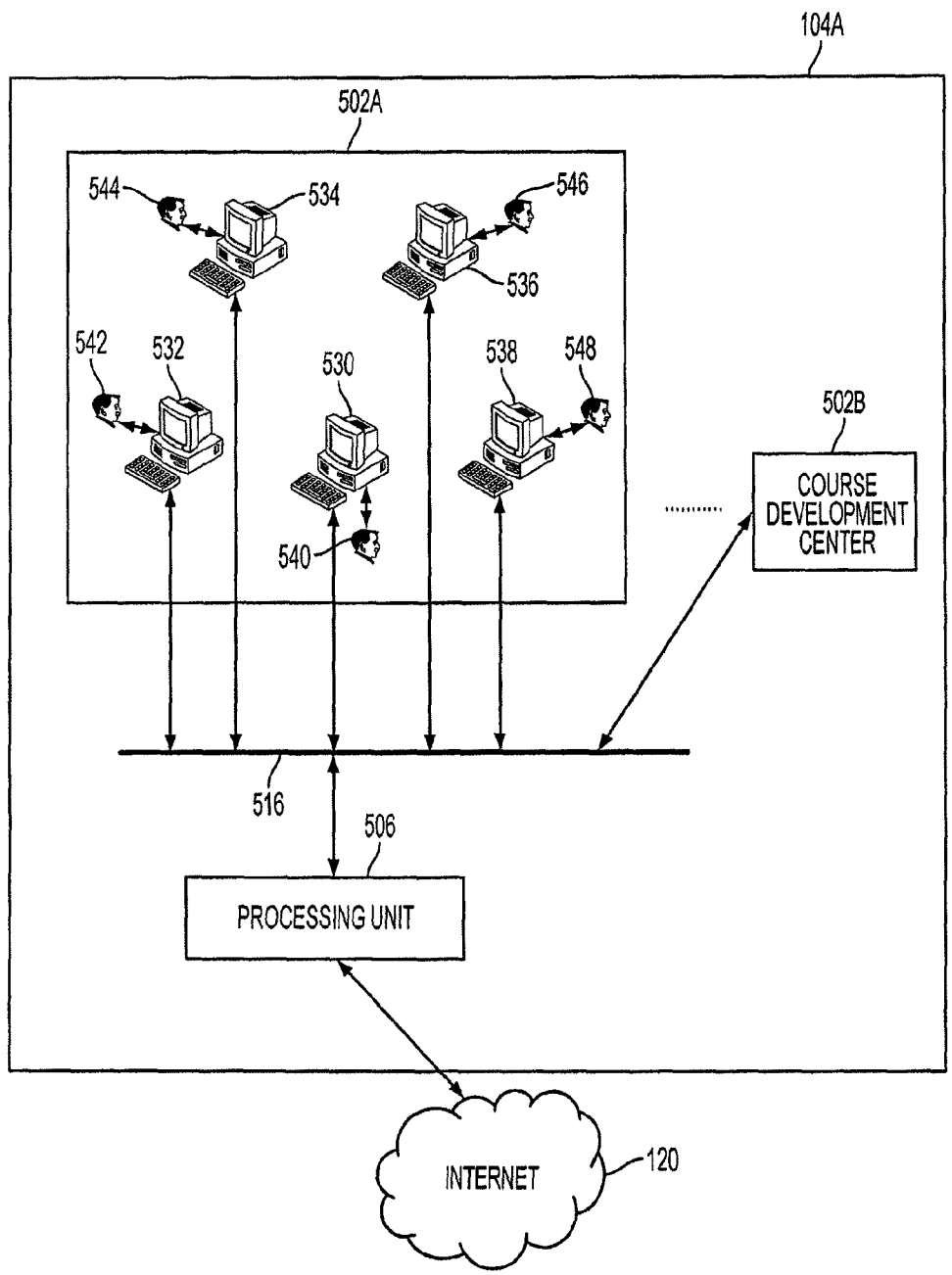
FIG. 5 shows an exemplary block diagram of a course development center of FIG. 2 having a plurality of reviewer stations, according to one embodiment of the invention.

FIG. 5 shows an exemplary block diagram of a course development center 104A including a plurality of reviewer workstations 502A, according to an exemplary embodiment of the invention. The reviewer workstations 502A are connected to a processing unit 506 via a local area network 516. In another embodiment, the reviewer workstations are connected to a processing unit 506 through an open network, for example the internet 120. The reviewer workstations 502a, including individual workstations 530-538 used by reviewers 540-548, are also connected through a network to a course development center 502B to facilitate the flow of information and communication between the reviewers 540-548 and the core team.

Figure 6:
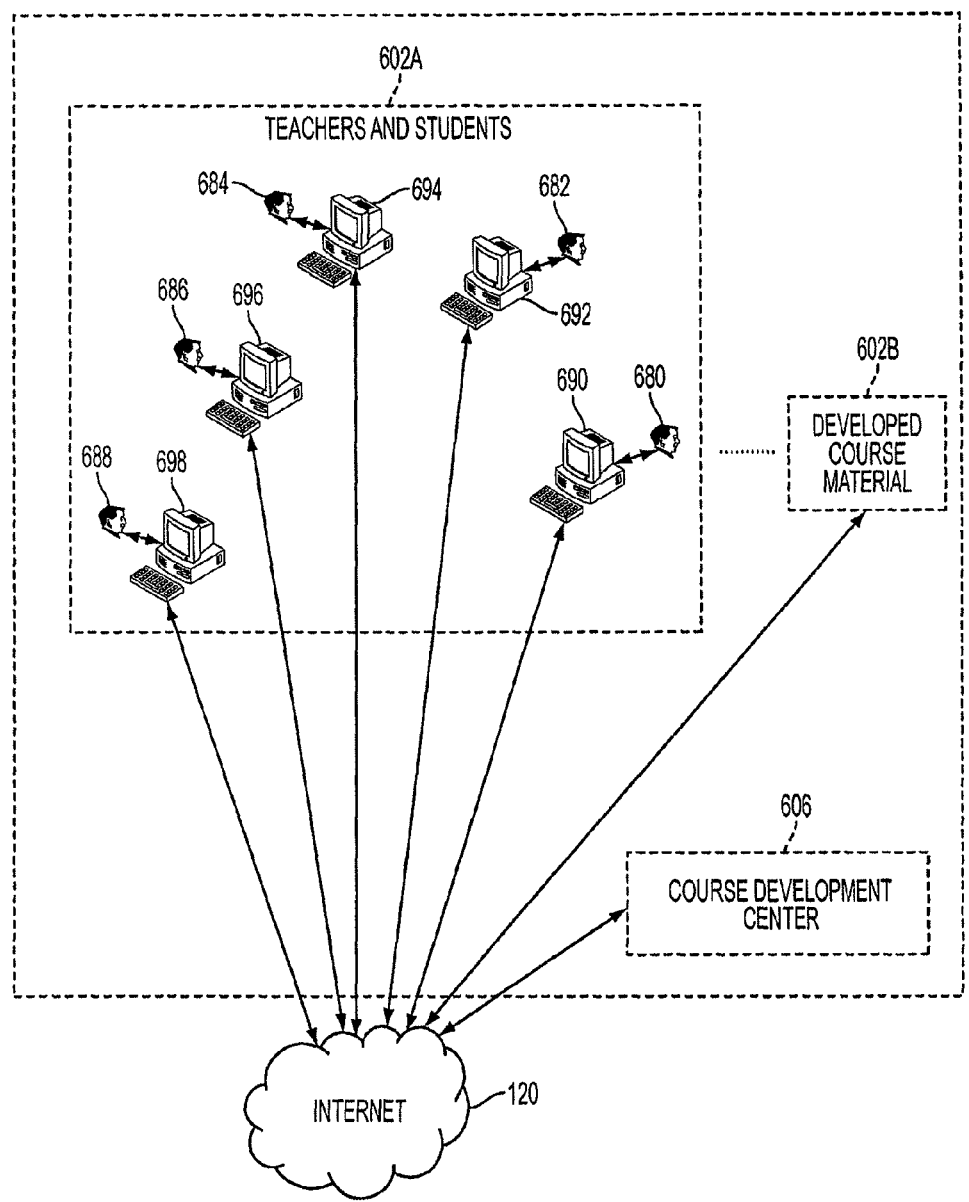
FIG. 6 shows an exemplary block diagram of a virtual course development center, according to one embodiment of the invention.

FIG. 6 depicts an exemplary block diagram of a learning system that delivers instructional material according to a course developed under the present invention, for example in a virtual classroom 602A setting. Within the virtual classroom 602A, there are a plurality of students 682-688 and one or more teachers 680, who hold learning sessions involving a developed course using workstations 690-698 which are connected to the internet 120. According to an embodiment, the virtual learning center also includes a course development center 606, which provides the course content to the virtual classroom 602A over the internet 120 according to the present invention. Additionally, a developed course material database 602B stores the course content included in the final course version resulting from the course development process. Teachers 680 and students 682-688 within the virtual classroom 602A can access the developed course content from the developed course material database 602B through the internet 120. They can also access the course development center 606 during or after participating in the course in order to provide feedback, suggestions, and other input to improve the course, creating a continuous development process.

In one exemplary embodiment, a course may comprise learning units presented in different learning environments as disclosed in U.S. patent application Ser. No. 12/469,502, filed on May 20, 2009, the specification of which is hereby incorporated by reference in its entirety. A learning unit comprises any session during which instructional material is delivered to one or more students. An online learning session means any learning session that takes place over a network. A learning environment comprises any environment created using instructional content, including learning workspaces, shared whiteboards, reference tools, such as a dictionary, encyclopedia, thesaurus, calculator, games, etc. and/or which connects at least two of students, instructors, facilitators and content experts. Instructional content means any material of instructional value used for instructing a student or for assessing a student's skills. Examples of instructional content are any one of work sheets, practice sheets, problem sets, as well as instructional audio, video, text, image, lectures, briefs, papers or documents in any format, software, environment, simulation, interface, content, presentations, documents, media files, test material, etc. Electronic instructional content comprises any instructional material that is delivered over a network. Exemplary electronic instructional materials comprise any instructional material delivered via electronic student or teacher workbooks.

In a further exemplary embodiment, the learning system of the present invention may create different learning opportunities, events, modules, course materials, and courses for environments that may vary in terms of students' learning experiences. Hence, the learning may be referred to as a Variable Learning Environment (VLE). In this embodiment, the present invention can accommodate and manage courses created for a plurality of different learning environments that are tailored for various educational networks, institutions, schools, universities, with each learning environment having different attributes in terms of faculty, instructional content, geography, technology, assessment criteria, etc. A learning environment for which courses and course materials are created by the course development system and method of the present invention may comprise a learning management system (LMS) (for example, Blackboard®, E-College® or Moodle®), a public personalized homepage (for example, MyYahoo®, iGoogle® or PageFlakes®), a social network (such as Facebook®, MySpace® or LinkedIn®), professional or academic portals (such as Campus Cruiser®, MS Exchange with Sharepoint®, Sunguard's Luminis Portal® and Gmail®), or a static standard html website, or a computer lab. Another learning environment that can be implemented by the course development system and method of the present invention is a mobile learning environment. E-books such as Amazon's Kindle® are becoming popular with the student community. A learning environment using e-books can be created by the system and method of the present invention for presenting instructional content to students. The same or different learning units can be presented in the different learning environments, for example, on-line, on-campus or a hybrid of both, whether locally, regionally or globally.

Figure 7:
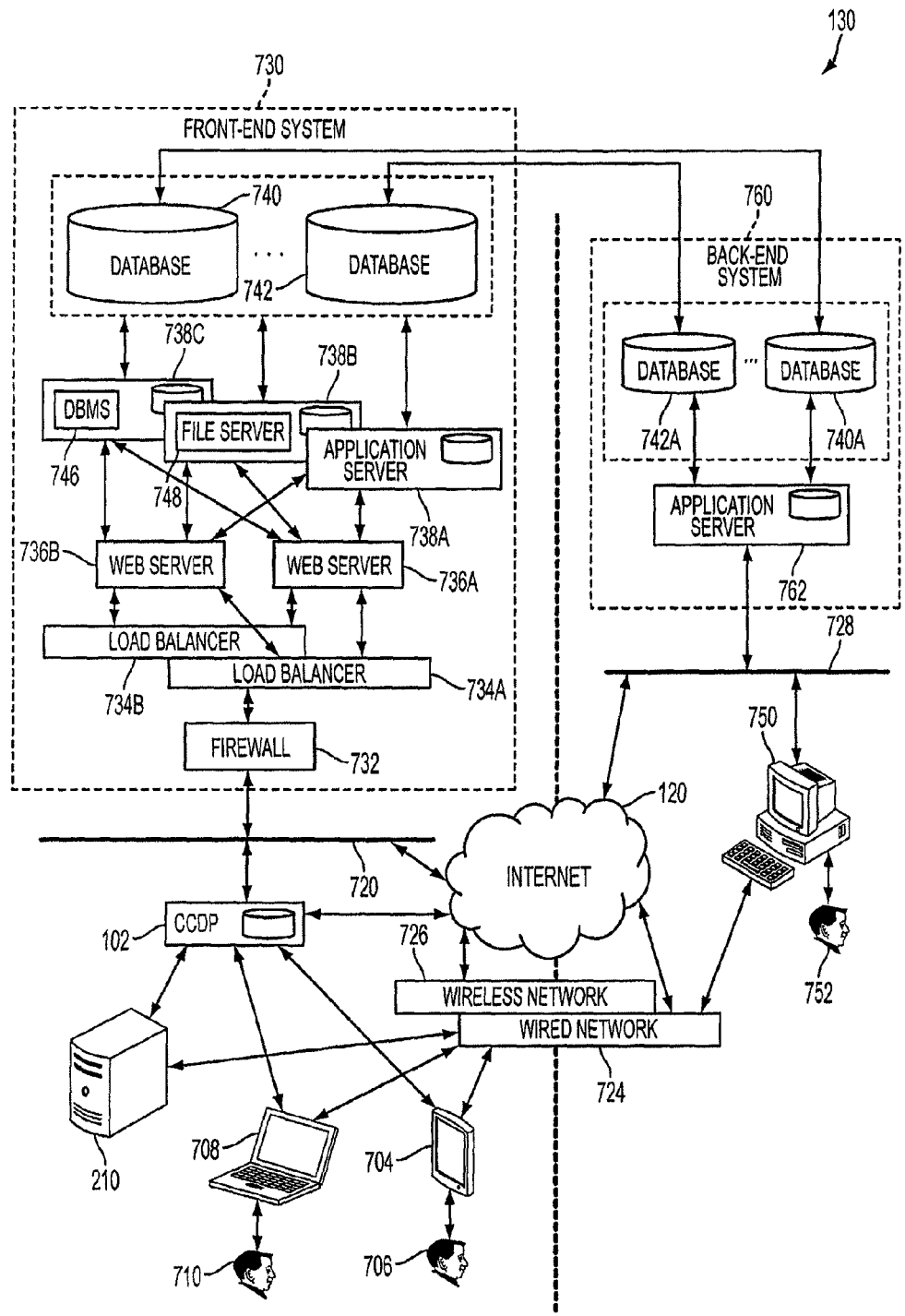
FIG. 7 shows an exemplary block diagram of an online course development system, according to one embodiment of the invention.

The course development environment of the present invention can be implemented using a standard mass collaboration systems as shown and described in connection with FIG. 7 or using a social networking service as shown and described in connection with FIG. 10. FIG. 7 shows an exemplary block diagram of the online CCDS 130 according to an exemplary mass collaboration embodiment. Some of the functions of the online CCDS 130 include establishing online mass collaboration sessions, development and delivery of course content material, as well as the creation of a course sketch and course scope and sequence. According to this embodiment, the CCDS 130 includes a front-end system 730 and a back-end system 760. The front-end system 730 provides user interfaces to participants for accessing the collaborative learning environment. The back-end system 760 is used for system administration, course development implementation in various learning environments, as well as application developments for billing, marketing, public relations, etc.

The front-end system 730 interfaces with the user devices 704, 708, allowing participants 706, 710 (e.g., core team members, reviewers and administrators, course developers, etc.) to interface with the collaborative course development environment according to the present invention. The front-end system 730 provides the participants interactive access to mass collaboration sessions. The user devices 704, 708 and/or the course development center server 210 are coupled to the CCDP 102 via a network 720, which may be LAN, WAN or other local network. Depending on design, the course development server 210 may also act as a gateway between the user devices 704, 708, and the course development center 104A (see FIG. 1), which manages the collaborative course development environment established according to the present invention. In this arrangement, the user devices 704, 708, and/or CDC server 210 may be coupled to the CCDP 102 via the Internet 120 or through a wired network 724 and/or a wireless network 726, for interface with the front-end and back-end systems 730 and 760.

In an exemplary embodiment, the user devices 704, 708 execute a network access application, for example, but not limited to a browser or any other suitable application or applet, for accessing the front-end system 730. The users 706, 710 may be required to go through a log-in session before engaging in an online development and entry into the collaborative course development environment through a suitable portal. Other arrangements that do not require a log-in session may also be provided in accordance with other exemplary embodiments of the invention.

In the exemplary embodiment shown in FIG. 7, the front-end system 730 includes a firewall 732, which is coupled to one or more load balancers 734A, 734B. Load balancers 734A-B are in turn coupled to one or more web servers 736A-B. For providing collaborative course development environment according to the present invention, web servers 736A-B are coupled to one or more application servers 738A-C, each of which includes and/or accesses one or more databases 740, 742, which may be central or distributed databases. Web servers 736A-B, coupled with load balancers 734A-B, perform load balancing functions for providing optimum online session performance by transferring client user requests to one or more of the application servers 738A-C according to a series of course sketches and/or rules. The application servers 738A-C may include a database management system (DBMS) 746 and/or a file server 748, which manage access to one or more databases 740, 742. In the exemplary embodiment depicted in FIG. 7, the application server 738A and/or 738B provides course development content to the participants 706, 708, which includes electronic interfaces, course content material, reviewer profiles, etc. Some of the instructional content is generated via code stored either on the application servers 738A and/or 738B, while some other information and content is retrieved along with the necessary data from the databases 740, 742 via application server 738C. The application server 738B may also provide users 702, 706 access to executable files which can be downloaded and installed on user devices 704, 708 for creating an appropriate virtual course development environment, with branding and or marketing features that are tailored for a particular application, core team member or reviewer.

The central or distributed database 740, 742, stores, among other things, the course content and instructional material deliverable to the reviewers or those provided by such reviewers or any other participant in the course development process of the invention. The database 740, 742 also stores retrievable information relating to or associated with the core team, reviewers, administrators, developers, the course development center, the content management center, the administrative center, reviewer profiles, billing information, schedules, statistical data, progress data, social network data, reviewer attributes, participant attributes, core team member attributes, mass collaboration data, ranking data, compliance data, certification data, billing rules, third party contract rules, educational district requirements, etc. Any or all of the foregoing data can be processed and associated as necessary for achieving a desired course objective associated with operating the system of the present invention. For example, statistical data related to reviewer attendance or schedule and/or core team member progress and schedule may be associated and/or processed for core team utilization and capacity planning as well as core team workflow management. One exemplary aspect of the invention uses the foregoing data processing to determine how many reviewers are needed and provides the mechanism to increase or decrease according to demand. By performing the capacity planning, the system arranges for scheduling more reviewers during specific times ahead where reviewer shortages are expected or "pulling" reviewer schedules where reviewer overages are expected.

Figure 8:
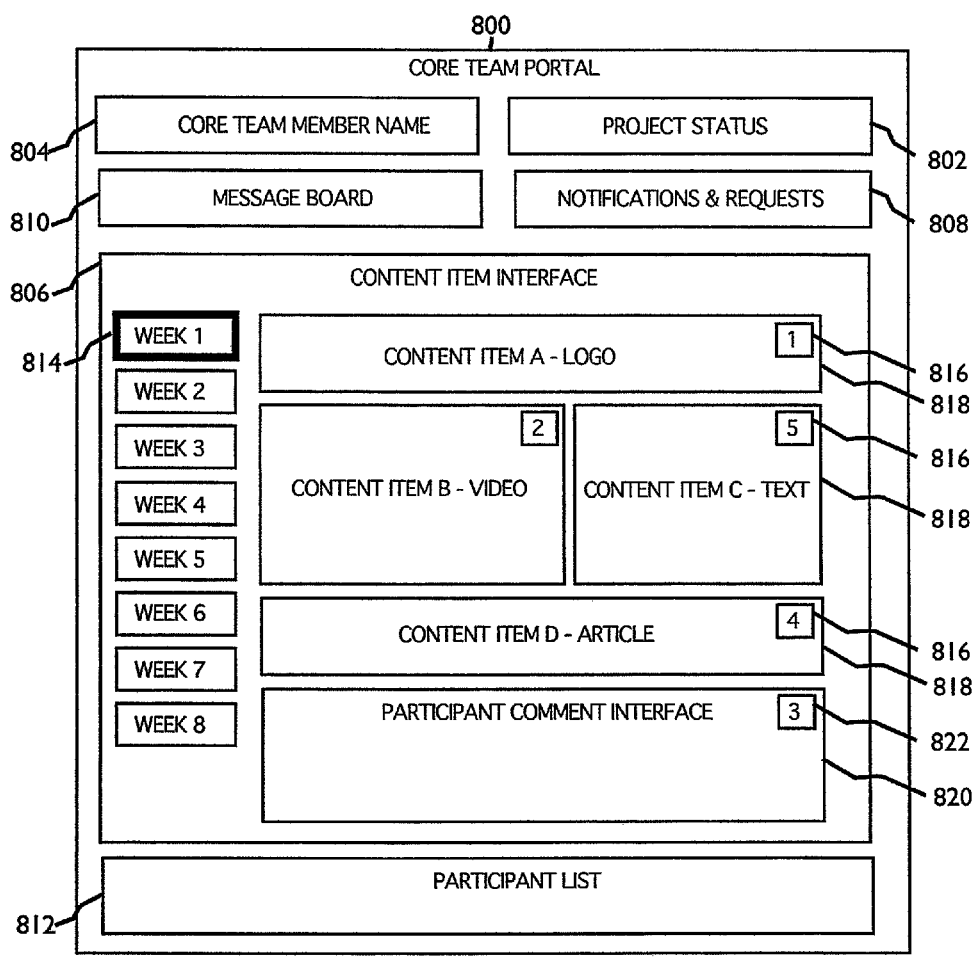
FIG. 8 shows an exemplary diagram of the collaborative course development portal of FIG. 7, as viewed by the core team, according to one embodiment of the invention.

FIG. 8 depicts an exemplary diagram of the collaborative course development portal as seen by members of the core team. The portal 800 provides access to online information, communication, and application tools. In one exemplary embodiment, the portal includes an information interface that identifies the name of the user 804, the project status 802, a message board 810, a participant list 812, notifications and requests 808, and a content item interface 806. The content item interface 806 in this embodiment includes a configurable template that matches the look and course organization of the course as it will be deployed. The course weeks 814 are listed, and selectable for display. In this diagram week one of the course 814 has been chosen for editing and viewing. The core team members can now add or change a content item 818 by drag-and-drop, text entry, or any other standard method for introducing and editing content. This is the primary interface into the course content management center server 310 in FIG. 3, and the content databases 326 and 328. Each content item includes a ranking mechanism 816 that in the core team interface 800 displays the average rankings as determined by all participants. Additionally, the portal includes a participant comment interface 820 for reading comments and suggestions tagged to, for example, a particular content item, learning frame, or course sketch framework item. In one embodiment of the invention, selecting a single participant from the participant list 812 allows the core team member to view only that participant's rankings, and see only that participant's comments in the participant comment interface 820. In such an embodiment, the core team member may also look at the ranking module 822 to see how all other participants ranked the comments made by the participant selected in participant list 812. In this manner the core team member may gain from the collective opinion of all contributors, and take into consideration the wisdom of a large mass of reviewers as well as his or her own opinions. The portal 800 can allow the core team to interactively communicate with and monitor reviewers in a collaborative manner as well as to communicate within the core team during core team development stages.

Figure 9:
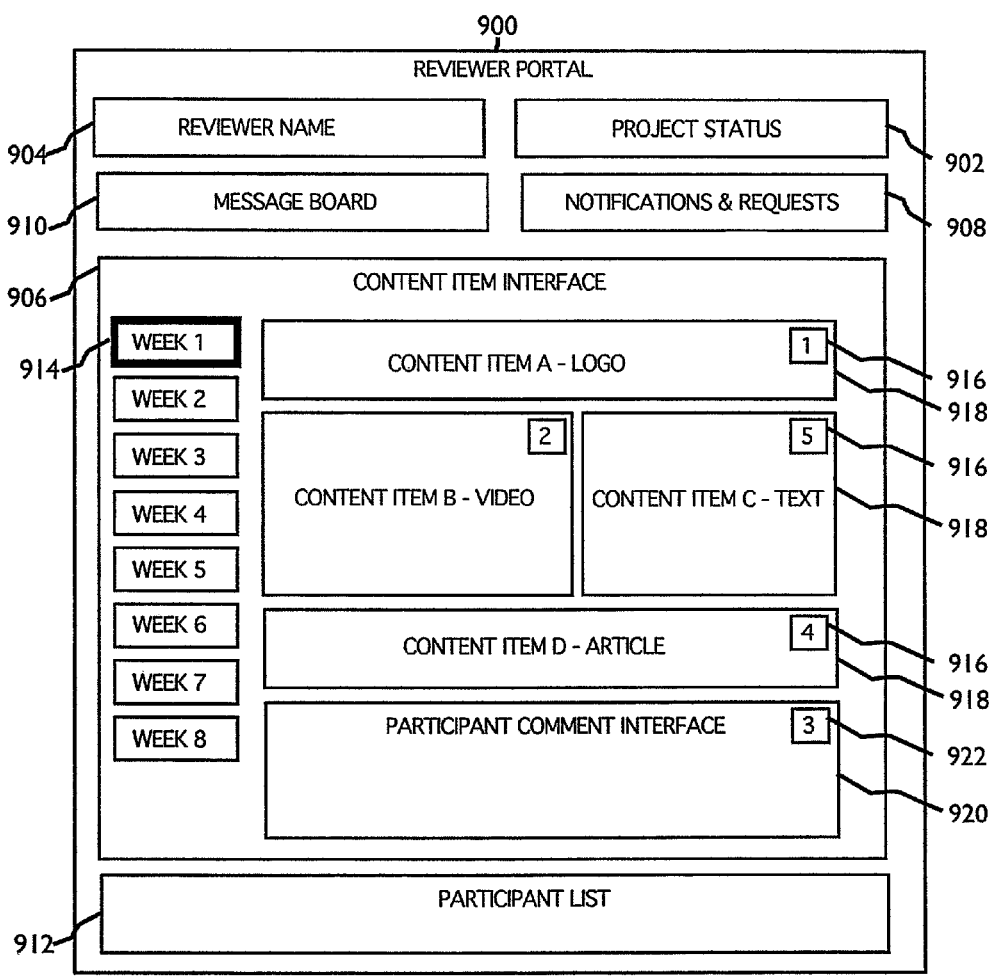
FIG. 9 shows an exemplary diagram of the collaborative course development portal of FIG. 7, as viewed by reviewers, according to one embodiment of the invention.

FIG. 9 depicts an exemplary diagram of the collaborative course development portal as is seen by a reviewer. The portal 900 provides access to online content, plus information and communication tools. In one exemplary embodiment, the portal includes an information interface that identifies the name of the reviewer 904, the project status 902, a message board 910, a participant list 912, and notifications and requests 908. Further, the portal may include a content item interface 906 that mirrors the core team content item interface 806, from FIG. 8. The reviewers see content items 918, but reviewers do not have permission to add or change content. They may interact with content (play videos for example). They may also rate content using the ranking mechanism 916. They may not see other participants' rankings, but only their own. In this embodiment, they use the participant comment interface 920 to comment on all the items in the content item interface for week one 914. In another embodiment, comments may be keyed to each individual content item 918. Further, in this embodiment participants may see other participants' comments regarding this content by reading those comments in the participant comment interface 920. They may also rank each participant's comments as they read them, using the ranking module 922. They may not see other participants' rankings of the comments, nor may they see rankings of their own comments. Only the core team can see the rankings of the various participants' comments, as defined in the core team portal 800. In another embodiment of the invention, participants may suggest different content by dragging and dropping it into the appropriate slots in the content item interface 906. Suggested content would then be available for the core team and other participants to view, comment on, and rank, though this suggested content would be marked clearly as content suggested by a participant. The portal 900 allows the reviewers to interactively communicate with the core team and other reviewers in a collaborative manner, as well as to evaluate and rank during the various course development stages and to suggest and upload course content items.

Figure 10:
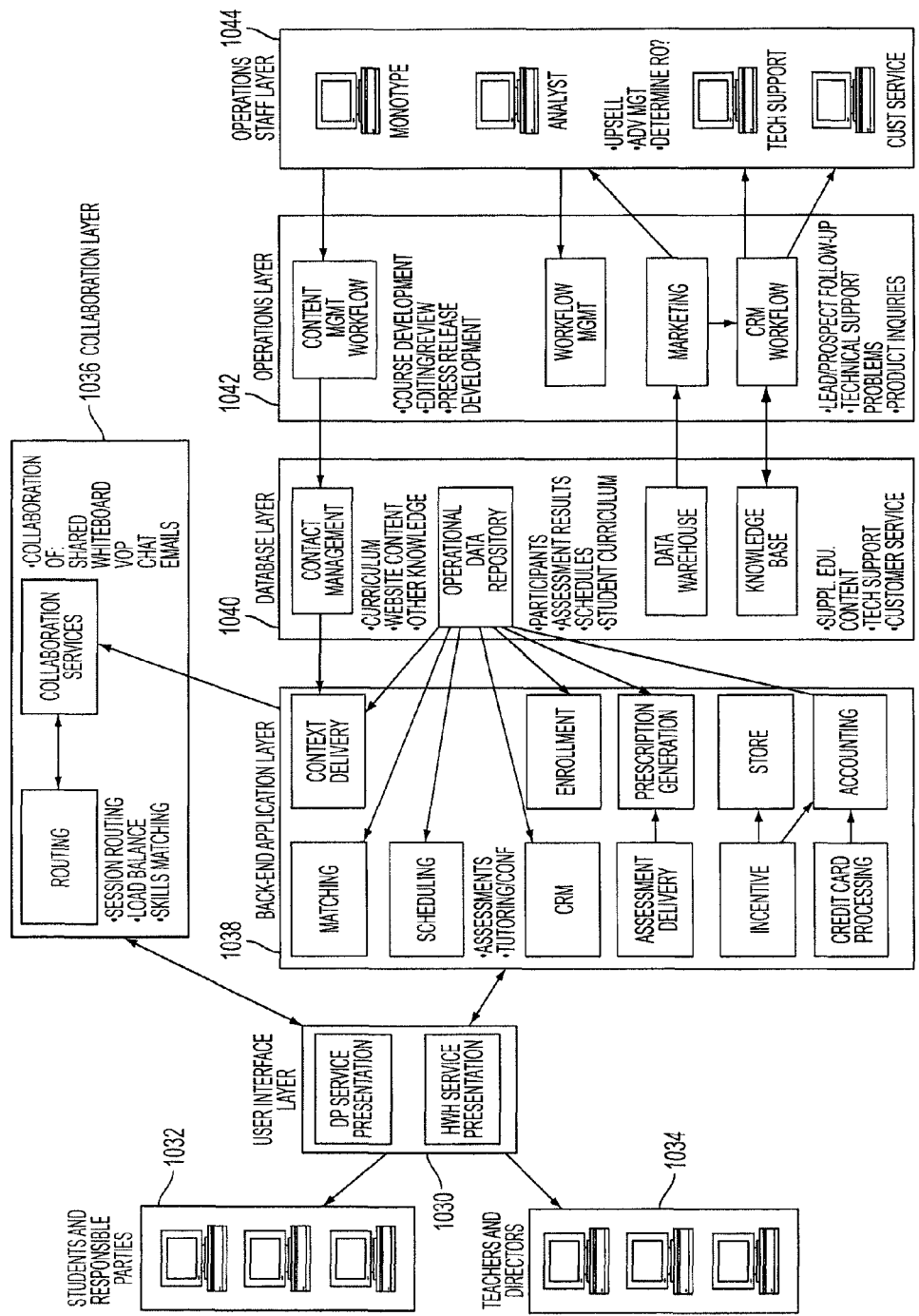
FIG. 10 shows an exemplary block diagram of the operation layers of the collaborative online course development system of FIG. 7.

Referring to FIG. 10, a block diagram of operation layers of the CCDS 130 is shown for creating a collaborative course development environment using a social networking service. The social network service offered by the system of FIG. 10 build online communities of participants, e.g., core team members, reviewers, developers, faculty, teachers, student, content providers and any other participant in the collaborative course development environment and course delivery according to the present invention.

In one embodiment, the social network that is used for creating the collaborative course development environment of the present invention is web-based and provides a variety of ways for participants to interact, such as via e-mail, chat rooms or instant messaging. In this way, the participants can communicate and share information for developing courses according to the present invention. Exemplary play social networking paradigms that may be implement under the present invention, include Facebook, Myspace, Twitter, LinkedIn, Tagged, Diggs, etc. According to an exemplary embodiment, in the social network site, contributors may be gathered, organized and authenticated into the development process. Participants in the social network may include, for example, but not limited to, faculty, students, practitioners, consultants, publishers, suppliers, course developers, etc. who wish to contribute instructional content. Participants may register and input their credentials. The core team may approve participants to collaborate and may manage the mass collaboration process. Further, appropriate non-disclosure agreements may be gathered online if necessary.

According to a further exemplary embodiment, a social site software module may be configured to organize participants in the collaboration process, enroll participants online, post required and voluntary personal and professional data of participants, define the connections of participants to one another, manage the selection of participants for development of a particular course or program, generate email lists of selected participants, and operate in multiple languages.

The CCDS shown in FIG. 10 includes reviewer workstations 1032 as well as core team and administrator workstations 1034. Each work station can be a node connected to the CCDS 130 from any location. The workstations 1032 and 1034 execute suitable application programs, e.g., browser, etc., for engaging in review and ranking activities within the collaborative course development environment using a social networking service. The course development program running on a reviewer workstation 1032 enables a reviewer to interact with a core team member or other reviewers during a non-interactive or an interactive mass collaboration session over an implemented social networking service. Course development application programs allows a core team member to engage reviewers in multiple mass collaboration sessions.

Various application program layers for supporting the CCDS 130 in the social networking service may include a user interface layer 1030, collaboration layer 1036, a back-end application layer 1038, a database layer 1040, an operations layer 1042 and an operations staff layer 1044. Each layer, or any of its components, can run on any suitably configured node, including servers or workstations, anywhere in the system in a central or a distributed manner.

The user interface layer 1030 is responsible for interfacing with the core team members, reviewers and administrators. The user interface layer 1030 receives input from multiple reviewer workstations and multiple core team and administrator workstations or any other node associated with the social networking service. The workstations 1032 and 1034 are equipped with, for example, but not limited to, keyboards, mouse, pen-based tablets, audio headsets, speakers, cameras, etc. In this way, the user interface layer 1030 can communicate texts, image, video and audio information with the nodes. Communication includes both the receipt and transmittal of information. In one embodiment, the core team and reviewers can attend collaboration or development sessions from any node as long as their respective access rights are verified via log-in processes within the social networking environment. For example, when a core team member logs in, the system provides the necessary core team rights and privileges for instructing and evaluating a reviewer. The back-end application layer 1038 may also manage content delivery, reviewer and course development item matching, as well as mass collaboration scheduling and billing functions. The collaboration layer 1036 may provide social networking collaboration amongst the participants, e.g., the core team, reviewers, course developers. The collaboration layer 1036 provides shared whiteboards and chat functions that may be required in a collaborative course development environment implemented under a social networking service. As stated above, the collaboration layer 1036 is responsible for routing and collaborating services. The collaboration layer 1036 allows utilization of Voice Over Internet Protocols (VOIP) standards in maintaining interactive channels for transmitting audio and video information. An interactive channel formed over links is used for holding an interactive session between the core team and one or more reviewers. The interactive session allows the core team and reviewers to interact with each other through workbooks and a shared whiteboard in a collaborative manner. A shared whiteboard is a shared display space reserved by the system for conducting interactive mass collaboration activities using various tools such as interactive highlighters, drawing and graphical tools, and etc. The collaboration layer 1036 also supports chat, e-mail, and other Internet features.

The database layer 1040 may manage information storage functions related to user and course or learning content environments, information and data, including textual documents, multi-media content, digital content and other knowledge base information. The database layer 1040 can also be a repository for operational data including the participants, schedules, ranking results and selected content items. Data warehousing functions and statistical analysis of reviewer ranking data against pre-defined satisfaction criteria may also be performed by the database layer 1040. The database layer 1040 may also manage the knowledge base comprising technical support, and customer service information.

The back-end layer 1038 may track various activities and inputs of each reviewer and may record reviewer input data, either automatically through the reviewer workstations 1032, or manually as results of core team inputs from a core team or administrator workstation 1034. The back-end application layer 1038 may also be responsible for delivering instructional materials to the user interface layer 1030. The back-end application layer 1038 may also track deliveries of learning content materials to be implemented in the course development process of the invention for charge calculation and billing purposes. The back-end application layer 1038 may also perform credit card processing and billing functions, for example, on a session by session basis, time or other criteria, as further described below.

Once enrolled, a reviewer is invited to participate in one or more collaborative course development efforts. The course development may be scheduled in accordance with the reviewer profile as specified within the social networking service. For example, a reviewer with an expertise in geology may be scheduled for a collaboration on that subject matter. A scheduling node (located anywhere in the system) tracks and manages reviewer scheduling. A reviewer/content matching node runs a matching algorithm for matching reviewers and learning content items based on the reviewer's particular area of expertise for collaboration sessions.

The operations layer 1042 may provide content management workflow, including adding course content, editing and reviewing the developed course using the system and method of the present invention. The operation layer 1042 may also manage marketing and CRM (customer relationship management) workflow. This layer may also provide for lead/prospect follow-up functions, technical support problems, and product inquiries. The operations layer 1042 may interface with the operational staff layer 1044 that comprises personal tech support, customer service and analyst information. The operations layer 1042 also may provide for routing of information over the network for sessions and load balancing of the core team.

Figure 11:
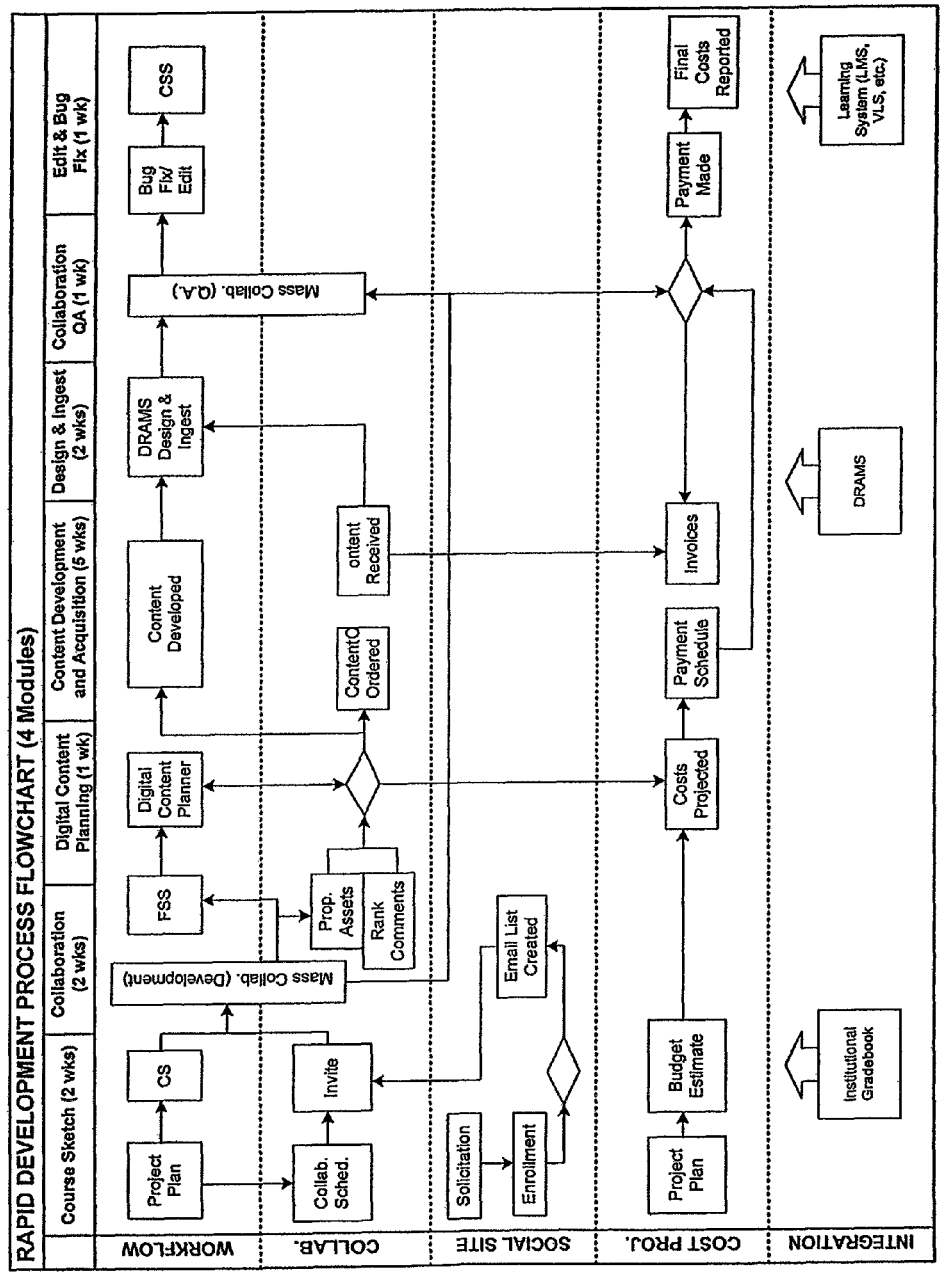
FIG. 11 shows an exemplary flow chart of the collaborative online course development method.

FIG. 11: Overall System and Method Description

As stated above, a system and method for developing a course according to the present invention requires a plurality of participants that collaborate over a network, for example, a social network. One or more databases stores an initial framework that defines a sequence of learning units for creating a desired learning environment for students, where the learning units are identified by corresponding learning unit identifiers. A plurality of workstations are coupled to the network. They are used for entry of reviewer information by the participants using the learning environment created for the students. The reviewer information comprise comments entered by one participant about a learning unit and a rank that is entered by another participant about the comment. The rank is correlated with a defined ranking standard represented by a value, 1-10 or other ranking attribute, good, bad, etc. A processor processes the rank according to a predefined criteria, e.g., a cumulative ranking, to produce a ranking result that is associated with a learning unit identifier. The ranking result is used for associating learning content to the learning unit identified by the learning unit identifier.

Course Sketch Phase. According to one embodiment of the present invention as described in FIG. 11, the course development process is initiated by defining an initial course framework by one or more core team participants. The initial framework, which is also referred to as course sketch (CS) or initial outline, can be prepared by executing a suitably designed application in a node. The software allows the core team members to select or build a template for the course into which content will be entered. This template will match the end-user environment, so that the developers and the reviewers will from the beginning work in an environment that matches the student's experience. Accordingly, the core team generates a course sketch document, which may comprise the rough draft, guideline or outline of the course to be developed, including its sequence.

Core team members set the parameters of a project plan, and invite reviewer participants from within the social site, or they invite them to join the social site so that they may contribute to the development. Reviewers may include, for example, any combination of course developers, content editors, students, faculty, content providers, parents and other stakeholders.

In this embodiment, the core team may comprise, for example, a course developer and faculty member. However, the core team is not limited to faculty members and course developers. Rather, the core team can comprise any number and combination of course developers, content editors, students, faculty, content providers, parents, etc. The initial course framework includes a sequence of learning units associated with the course. The core team may be selected to develop and manage the workflow for a specific course.

A cost module executed in the back-end system monitors all financial aspects of the course development process. At the beginning of the process, a budget is set in accordance with the project plan. The cost module may then begin to generate projected cost reports to aid the core team in course development decision-making.

Collaboration Phase. Again according to FIG. 11, in this exemplary embodiment, a collaboration phase follows the development of the initial course sketch. Under the social networking service, selected reviewers may now participate in the collaborative course development environment. The reviewers can engage in mass collaboration, which includes individual peer reviews and ranking of the proposed content of the course that has been selected by the core team for review. Invited reviewers can view the course sketch as it is being developed and can see the suggestions of other participants in real time. In an exemplary embodiment, as reviewers offer suggestions for improving the course sketch, other reviewers and/or participants are able to rate and comment upon each suggestion.

In this exemplary embodiment, the core team can invite participants to insert content items associated with the sequence of learning units. Once the content items are inserted, reviewers are allowed access to the content items over a network. Reviewers specify their rankings of the items over the network, and make comments regarding those items. Reviewers rank other reviewers' comments. The reviewer rankings are compared to a predefined satisfaction criteria and the content items are modified based on the comparison results.

According to this phase of the exemplary embodiment, a final scope and sequence (FSS) can now be generated efficiently and quickly from the course sketch, due to the benefit of multiple areas of expertise provided by the collaborating participants. Based on the course sketch and the reviewer's peer review and ranking, the core team may further add substantive course materials and/or instructional content to the developed course scope and sequence. Again, the development process is benefited by virtue of the multiple areas of expertise compiled in the mass collaboration process. Thus, the core team's burden of searching for appropriate content material to add to the course sketch is substantially reduced.

Digital Content Planning. In the process defined in this embodiment and as described in FIG. 11, once the final scope and sequence (FSS) has been generated, the core team may engage in digital content planning and create a digital content planner. Such planning may be performed in conjunction with cost planning or cost projection. Additionally, as shown in FIG. 12, the core team may further engage the help of faculty, designers, writers and producers and may finalize the content plan.

Content Development and Acquisition. According to the process of this exemplary embodiment as shown in FIG. 11, a content development and acquisition phase now allows time for any content suggested to be acquired, or any content that must be generated, e.g. videos that need to be produced, to be created. During the content development and acquisition phase, the core team may order and receive instructional content to be inserted into the course. The core team may enlist the help of content providers and media producers to create and outsource digital content assets (See FIG. 12). A record of content received may be stored as invoices received and entered.

Design & Ingest. At this point according to FIG. 11 of the embodiment, the final course design is locked into place, assets are ingested into the course system, which according to U.S. patent application Ser. No. 12/469,502, filed on May 20, 2009, may be the content ingest capability of the disclosed Variable Learning Environment. The content itself may be stored in the content management center server 310.

Collaboration Quality Assurance (QA). According to this exemplary embodiment as described in FIG. 11, once substantive course material and/or instructional content has been acquired and created and ingested, the core team can again invite the same reviewers and/or different collaboration participants to review and rank the course content, for quality assurance (QA) purposes. This review process is conducted by allowing the reviewers and/or participants to view learning frames that were developed as a result of the first mass collaboration step. Again, the core team can select reviewers through a social network and the selected reviewers may rate and comment upon the learning frames including the course content, as well as other participants' comments and suggestions.

Edit and Bug Fix. In a further exemplary embodiment according FIG. 11, following the second mass collaboration for QA, the core team may process all comments and rankings provided by the reviewers using pre-defined satisfaction criteria. The core team may edit or modify, add or delete course content from the learning frames of the course sketch and may produce a final version of the course sketch, thus creating the final course product. A bug/edit report may be generated in the workflow module wherein comments to be acted on are highlighted and a final list with checkboxes for edit and bug fixes is produced. Using the report, a bug/edit schedule may be set. Comments with editing instructions may be sent via email to the appropriate party. Edited and fixed media may be re-ingested into DRAMS and fixes may be checked off the list as they occur.

In this exemplary embodiment, the present invention includes the ability to track the effort expended by the participants, including the core team, reviewers, etc., in creating the course sketch and the course scope and sequence. Tracking the work effort and costs of the course development, along with all costs for building and licensing content assets, allows the system to generate a final cost report, concurrent with the final Edit & Bug Fix phase.

Use of the Process for Revisions of Existing Courses. In another exemplary embodiment, the present invention can be used to revise courses built previously. Existing course material may be loaded into the system by the core team and participants can be invited to comment upon and rank the materials. Entire sections of the existing course can be replaced or smaller sections revised. This embodiment again shows how the use of mass collaboration can avoid time-consuming and expensive course development processes to create a new course.

Use of the Process for Creation of Entire Programs. In another exemplary embodiment, the present invention may be further used to develop an entire program involving multiple courses. Mass collaboration reviewers and/or participants may be invited to review and comment on the inclusion of courses that are to comprise the program.

Specific System Features

Administrator. In an exemplary embodiment, course development may begin with the assignment of a faculty member and course developer as the "core team" to manage the entire workflow of the course development process. An administrator may enroll the core team, enter cost per hour, or per day, and calculate salary and a firm fixed price for the course development. Such salary input may be limited to administrator access only.

Course Sketch. In an exemplary embodiment, the core team may be responsible for creating the initial framework for the course otherwise referred to herein as the course sketch, which meets course development goals and milestones within a workflow module. The initial course framework represents the rapid, low-cost development of a rough draft or outline version of the entire course scope and sequence. In this embodiment, the course development method used commonly in which a single faculty member creates a course may serve as the method for creating a course sketch in the context of this invention. The course sketch or initial framework may be viewed as the wireframe upon which the collaboration is built. The core team is responsible for inputting initial course data, such as name, number, program, school, university or college and launch date. Then, the core team outlines the course objectives, content, potential and desired content sources, assignments, grading and assessment plan, and the course template. Using online tools through the workflow module, the course sketch may be created in less than a week.

Underlying Workflow Software. A workflow module is software designed to guide the core team through the development process. Specifically, the module may house the main work product, including the course sketch, store content items in a database, and interface with an institutional gradebook, digital rights (DRM) and digital asset management system (DAM) and other systems of interest. Similarly, the module may track time on task as input by users, may include dependencies and sequencing of tasks, and may not include resource allocation. Additionally, the workflow module may differentiate between the developer roles, including for example, but not limited to, content expert, course/program administrator, etc.

Course Sketch Template. As stated above, the workflow module allows a template chosen or created by the core team representing the initial framework or course sketch to be presented to the reviewers. The module may then move to identifying course learning objectives keyed to program outcomes and entered in a unique field. The module may interface with an institutional gradebook to store this field as part of the assessment data associated with the developed learning units. The template in use may be filled out by a student work package, or a specific amount of designed educational material: for example, Week One, Week Two, etc. Such an exemplary weekly template may include the following: learning objectives for the week, a description of content or subject matter for the week, an assessment plan for the week, and a suggested student work timeframe for the week, which can be edited on an item basis per time estimate for an average student to finish. The exemplary weekly template may also include: prior knowledge, discussion questions, content experts to be included, digital media to be used, articles to be included, textbook chapters to be read, outside assignments to be accomplished, team assignments to be accomplished and quizzes or exams to be taken.

Access to Mass Collaboration Function. As stated before, the core team may be responsible for managing the collaborative source development environment of the invention under a social networking paradigm. During the course development process, participants are invited into a social course development site. In one embodiment, a participant may request access to the social site by entering his or her own contact information, work history, academic history, publications, awards, honors, personal items of interest, connection to other participants by invitation, and by level of knowledge. A potential participant report may be generated and forwarded to the core team highlighting key resume items. The core team may decide on and develop a participant email list. Subsequently, invitations for collaboration may be sent to participants with a password. Additionally a budget estimate may be generated based on input from time estimation, as well as a course content budget.

Reviewer Feedback on Template. In another exemplary embodiment, the core team may post the initial framework of the course for invited participants to review during the peer review. Although, the framework may only be edited by the core team, unless others are authenticated and authorized by the core team or an administrator, invited participants and/or reviewers may post comments and suggestions regarding the substance of the initial framework.

Authentication and Legal Language for Reviewers. In a further exemplary embodiment, invited participants may log into a mass collaboration environment through an authentication system. The authentication system may provide information to the participants regarding a legal agreement regarding intellectual property, non-disclosure terms and a privacy policy.

Comments from Reviewers. In one exemplary embodiment, the core team may collect comments entered by reviewing participants during mass collaboration. A comment may be keyed to a specific item of the course sketch or initial framework, a particular learning unit identifier or content items visible to a reviewer. Furthermore, other participants may see submitted comments which may be posted anonymously. If a post is anonymous, only the actual reviewing participant, as well as the core team, can see the reviewer's name attached to a submitted comment. Under this anonymous system, reviewers may rank comments submitted by others. For example, comments could be ranked on a numerical scale; 1 (poor) to 5 (great). Or to avoid the idea of competition, the scale could be 1 (disagree completely) to 5 (agree wholeheartedly). Such rankings may be combined via various techniques, i.e., weighted based on reviewer's profile by the core team, weighted by positive or negative ratings or rankings received in previous course developments, or non-weighted. The result of the combination may be compared with a predefined criteria during the review process to help the core team decide whether a proposed course content item should be added or deleted from the sequence.

Mass Collaboration Tools and Technologies. The mass collaboration system may use "web 2.0" tools, including Wikis®, PHP/HTML data interface, Review and Rank (for example, Amazon®, eBay®, Digg®, etc.), Tagging and Social Networking (for example, Facebook®, Myspace®, Linkedin®, etc.), to allow participants to comment on and make recommendations for the course sketch. The software 1) allows the core team to accept comments and edits from multiple sources, 2) enables appropriate tagging technology to allow anonymous commenting and editing to be viewed by other collaborating participants, and 3) implements a rating technology that allows the tagging input to be reviewed and ranked by other participants. This threefold method allows the core team to make informed adjustments and modifications to the course sketch based on the comments and rankings of the collaboration participants.

Reviewers Proposing Content. According to a further embodiment, the invention may allow mass collaboration participants and reviewers to suggest and upload course content for the source sequence, and scope. Suggested course content could include, for example, video, audio, simulations, text, journal articles, websites, chapters of eBooks, etc. Publishers and other content providers may also propose specific course content, including digital content, to be used that may be keyed to content items in the course sketch. In addition, the content provider may submit content copyright clearance terms and bid fees to be paid for a proposed course content item. Content vendors may provide links to large files for proposed content and may upload small files so that reviewers may view and comment on the proposed content. The core team may counter-propose terms and may request delivery dates. Such course content replaces the traditional hardcopy textbook that students are often required to purchase at the beginning of a course. This is a cost-effective and environmentally-friendly method of providing the most up-to-date information to course-enrolled students.

Content Marketplace. In one embodiment, an additional step may be scheduled in the Content Development phase of FIG. 11 in which only content providers such as publishers and owners of media libraries may be invited to suggest their own content, either in place of placeholder content (described below) or instead of content presented in the course sketch. In this embodiment, the content providers are invited into the mass collaboration process prior to the reviewers. Content Marketplace functionality allows content providers to upload their own content, and set a price for it which is then reviewed by the core team. In another embodiment, the core team may counter that price. When an agreement is reached, the system generates an invoice for that amount. In the content marketplace, content providers would agree in advance to legal conditions surrounding their participation, so that agreements on content would be binding, and require no further contract negotiations.

Auto-Sort of Data. In one exemplary embodiment, once the core team has collected all of the participant comments and rankings, the data can be auto-sorted. Collected comments and proposals related to a specific content item, learning unit or area may be isolated, gathered together and reviewed. Comments are ranked using pre-defined satisfaction criteria. The core team may incorporate the comments and proposals into the course sketch through editing. When a change is made to a portion of the course sketch on which others have commented, those participants may be sent an automated email notifying them of the change. Changes to the course sketch are tracked by the system. The core team may send emails to reviewers, keyed to certain paragraphs or pages to solicit further comments.

Reports and Other Output Generated. To aid in the mass collaboration process, a mass collaboration software module may be configured to organize collaborative input from multiple sources and then provide multiple outputs and reports for the core team. In one embodiment, the mass collaboration software module may manage anonymous ranking and generate a list of proposed content items, including fees, property rights and delivery timeframes. Further, the software module may generate content orders, generate a ranking list of participants and their combined rankings based on the way their comments were rated, and manage receipts for each content items selected by the core team. The mass collaboration system allows the core team to compile reliable information that will enable them to make informed choices on content sources, media, activities, discussion questions, flow, assignments and learning objectives, and on which participants to invite to additional course developments. Cumulative ranking of participant comments may further be used for calculating participant compensation. An online checklist may be generated to track content item status. The checklists would indicate when the content order form was sent and when the content item was checked off by the core team as having been received in an acceptable form from the provider. The payment schedule may be generated by a cost projection module, wherein "Okay to Pay" designation may be created when content items are checked as received in acceptable form by the core team. Furthermore, the core team may facilitate the development of content internally using key milestones or utilize course content from an already existing course. The projected costs based on the fees and costs identified in the content order form may be automatically emailed to the administrator and the core team.

Placeholder Content Items. In an exemplary embodiment, the core team begins by choosing, creating, and storing data and content in the course sketch phase. At this stage, however, many items will not be available. The core team can then use placeholder tags and descriptions for so that participants in the mass collaboration can comment and suggest other content. For example, a placeholder content item may be added by the core team that says "Interview video with Bill Gates goes here," as a pointer which may be a graphic stored in a specific location in the course sketch as a placeholder, to be replaced by a video object later in development. During the mass collaboration process, a content provider may suggest instead an interview with Steve Jobs, and the core team may select this as a better option. When the Steve Jobs interview video is secured, the video media may be ingested and may replace the placeholder pointer. This method allows minimal editing for content items, early generation of metadata and items keyed to objectives and assessments from their formative stages.

Course Syllabus Generation. According to a further exemplary embodiment, the workflow module may use the course scope and sequence to generate a course syllabus according to a preset syllabus template. Textual content descriptors form the course sketch may be automatically loaded into the course scope and sequence.

Metadata. The core team may enter metadata to identify the course content objects when they are in the database, so that it can easily be located in searches later. This data may be entered into configurable fields when the content is ingested into learning frames. If the content item is placeholder content, media may replace the placeholder where applicable, and any text placeholder content may become keyword tags as well as becoming mouseover (a graphic user interface event that is raised when the user moves or "hovers" the mouse cursor over a particular area of the graphical interface) content. such text may remain in place for editing as supplemental content (becoming a text-based content item) where applicable. Additionally, digital data may be automatically extracted from content items for metatags, and metadata collected in previous phases may be imported. After generating the final learning frames, the core team may add additional tags and metadata according to the required metadata fields, and perform a quality check on the final product's metadata fields.

Workflow Configurability. FIG. 11 depicts an exemplary block diagram of the collaborative course development method, according to an embodiment of the present invention. The process is divided into five integrated tasks, including workflow, collaboration, social site, cost projection and integration, each of which may occur simultaneously. In one exemplary embodiment, the workflow module is configurable. The workflow includes the project plan and defines the amount of time and the number and type of inputs required in each phase (phases include course sketch, collaboration, etc). For one course development, the process may involve two weeks to develop the course sketch, two weeks of collaboration for development, one week for digital content planning, five weeks for content development and acquisition, two weeks for design and ingest, one week of collaboration for quality assurance and one week for editing and bug fixing. For another course development, each of those time frames may be shifted to be longer or shorter, as required by the core team and the development process. In a third course development, steps may be dropped, or additional steps added.

Inputs, Outputs, Resources, and Process. FIG. 12 is a rapid development process chart, including exemplary inputs, outputs, resources and processes for each course development step, to be viewed in conjunction with the embodiment described in FIG. 11.

Further Integration. In a further embodiment, the rapid development process may integrate the developed course with an institutional gradebook, Digital Rights Management (DRM), Digital Asset Management (DAM), and/or a learning system, including, for example, a learning management system (LMS) or variable learning system (VLS).

It will be understood that the above description of the present invention is susceptible to various modifications, changes and adaptations, and that the same are intended to be comprehended within the meaning and range of equivalents of the appended claims.

What is claimed is:

1. A system for developing a course of study for students by a plurality of participants over a collaborative network, comprising:

a database coupled to the network, said database storing an initial framework that defines a sequence of learning units that create a desired learning environment for the students, said sequence of learning units being presented to students over a time period based on a template that is associated with a student work timeframe, the sequence of learning units being presented to the students during the desired learning environment to achieve learning objectives over the time period, said learning units having corresponding learning unit identifiers, a collaborative course development server coupled to the network, said collaborative course development server executing applications that provide one or more collaborative course development environments to said plurality of participants;

a plurality of workstations coupled to the network for entry of reviewer information by the participants, said reviewer information comprising a comment entered by a first participant about a learning unit and a rank entered by a second participant about the comment, said rank being correlated with a defined ranking standard, wherein said comment is posted anonymously and said comment is on course content that is uploaded by a third participant;

a processing unit in communication with the network, said processing unit sorts participant information automatically and processes the rank according to a predefined criteria to produce at least one ranking result that is associated with a learning unit identifier, wherein said at least one ranking result, the comment on course content, and the course content are used for associating learning content to the learning unit identified by the learning unit identifier.

2. The system according to claim 1, wherein at least one of the learning units is identified by a place-holder pointer for insertion of one or more learning content after the sequence of the learning units is defined.

3. The system according to claim 1, wherein said participants comprise a plurality of reviewers that enter the reviewer information anonymously and at least one core team member involved in defining the initial framework who has access to the anonymously entered reviewer information.

4. The system according to claim 1, wherein said reviewer information is entered based on the learning environment created for the students.

5. The system according to claim 1, wherein said collaborative network comprises a social network.

6. The system according to claim 1, further including a participant tracking module that tracks the anonymous comments entered by a participant for compensating the participant based on a defined compensation criteria.

7. The system according to claim 1, further including a content acquisition module that generates a learning content order to a content publisher.

8. The system according to claim 1, further including at least one of a digital rights management (DRM) system or a digital asset management (DAM) system that interface with said database after the learning content is associated with the learning unit.

9. The system according to claim 1, further including an institutional gradebook that interfaces with said database.

10. The system according to claim 1, further including a workflow module that sets the schedule for guiding the participants through the course development process.

11. The system according to claim 1, wherein said course content is at least one of a video, an audio, a simulation, a text, a journal article, a website, a chapter of an eBook, an eBook, a work sheet, a practice sheet, a problem set, a lecture, a brief, a paper, a document, a software, an environment, an interface, a content, a presentation, a media file, a test material, or any combination thereof.

12. The system according to claim 1, wherein said comment is tagged to at least one of a particular content item, a learning frame, a course sketch framework item, or any combination thereof.

13. The system according to claim 1, wherein said comment is on a place-holder content item.

14. A method for developing a course of study for students by a plurality of participants over a collaborative network on a computer system, comprising:

storing an initial framework, in a database coupled to the network, that defines a sequence of learning units that create a desired learning environment for the students, said sequence of learning units being presented to students over a time period based on a template that is associated with a student work timeframe, the sequence of learning units being presented to the students during the desired learning environment to achieve learning objectives over the time period, said learning units having corresponding learning unit identifiers, executing, via a collaborative course development server coupled to the network, applications that provide one or more collaborative course development environments to said plurality of participants;

entering reviewer information by the participants, via a plurality of workstations coupled to the network, said reviewer information comprising a comment entered by a first participant about a learning unit and a rank entered by a second participant about the comment, said rank being correlated with a defined ranking standard, wherein said comment is posted anonymously and said comment is on course content that is uploaded by a third participant;

sorting, via a processing unit in communication with the network, participant information automatically and processing the rank according to a predefined criteria to produce at least one ranking result that is associated with a learning unit identifier;

associating learning content to the learning unit identified by the learning unit identifier based on said one ranking result, the comment on course content, and the course content.

15. The method according to claim 14, wherein at least one of the learning units is identified by a place-holder pointer for insertion of one or more learning content after the sequence of the learning units is defined.

16. The method according to claim 14, wherein said participants comprise a plurality of reviewers that enter the reviewer information anonymously and at least one core team member involved in defining the initial framework who has access to the entered reviewer information.

17. The method according to claim 14, wherein said reviewer information is entered using the learning environment created for the students.

18. The method according to claim 14, wherein said collaborative network comprises a social network.

19. The method according to claim 14, further comprising tracking the anonymous comments entered by each participant, via a participant tracking module, for compensating each participant based on a defined compensation criteria.

20. The method according to claim 14, further including generating a learning content order to a content publisher.

* * * * *